(12) United States Patent
Hirota et al.

(10) Patent No.: US 9,203,990 B2
(45) Date of Patent: Dec. 1, 2015

(54) PRIORITY ORDERED USER INTERFACE SCREENS FOR CONTROLLING A DEVICE

(71) Applicant: CANON KABUSHIKI KAISHA, Tokyo (JP)

(72) Inventors: Makoto Hirota, Tokyo (JP); Kenichiro Nakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/137,816

(22) Filed: Dec. 20, 2013

(65) Prior Publication Data

US 2014/0104654 A1    Apr. 17, 2014

Related U.S. Application Data

(63) Continuation of application No. 12/642,374, filed on Dec. 18, 2009, now Pat. No. 8,638,335.

(30) Foreign Application Priority Data

Jan. 30, 2009    (JP) ................ 2009-020227

(51) Int. Cl.
*G06F 13/14* (2006.01)
*H04N 1/00* (2006.01)
*H04N 21/431* (2011.01)
*G06F 3/14* (2006.01)

(52) U.S. Cl.
CPC ....... *H04N 1/00408* (2013.01); *H04N 1/00339* (2013.01); *H04N 21/4312* (2013.01); *G06F 3/14* (2013.01)

(58) Field of Classification Search
None
See application file for complete search history.

(56) References Cited

U.S. PATENT DOCUMENTS

| | | | | |
|---|---|---|---|---|
| 7,058,902 | B2 * | 6/2006 | Iwema et al. | 715/810 |
| 7,443,521 | B2 * | 10/2008 | Saito et al. | 358/1.13 |
| 2005/0219227 | A1 * | 10/2005 | Yamahata et al. | 345/173 |
| 2006/0227358 | A1 * | 10/2006 | Brunninger et al. | 358/1.14 |
| 2007/0195386 | A1 * | 8/2007 | Shinohara et al. | 358/527 |
| 2009/0322790 | A1 * | 12/2009 | Behar et al. | 345/659 |
| 2011/0084925 | A1 * | 4/2011 | Baik et al. | 345/173 |

FOREIGN PATENT DOCUMENTS

JP    2003195994 A    7/2003

* cited by examiner

*Primary Examiner* — Edward Martello
(74) *Attorney, Agent, or Firm* — Canon U.S.A., Inc., IP Division

(57) ABSTRACT

An information processing apparatus includes a storage unit configured to store information representing a plurality of screens in each of a plurality of groups to which priorities are previously set, a determination unit configured to determine a group which is assigned the highest priority, and a control unit configured to display on a display unit a representative screen of the group assigned the highest priority.

14 Claims, 8 Drawing Sheets

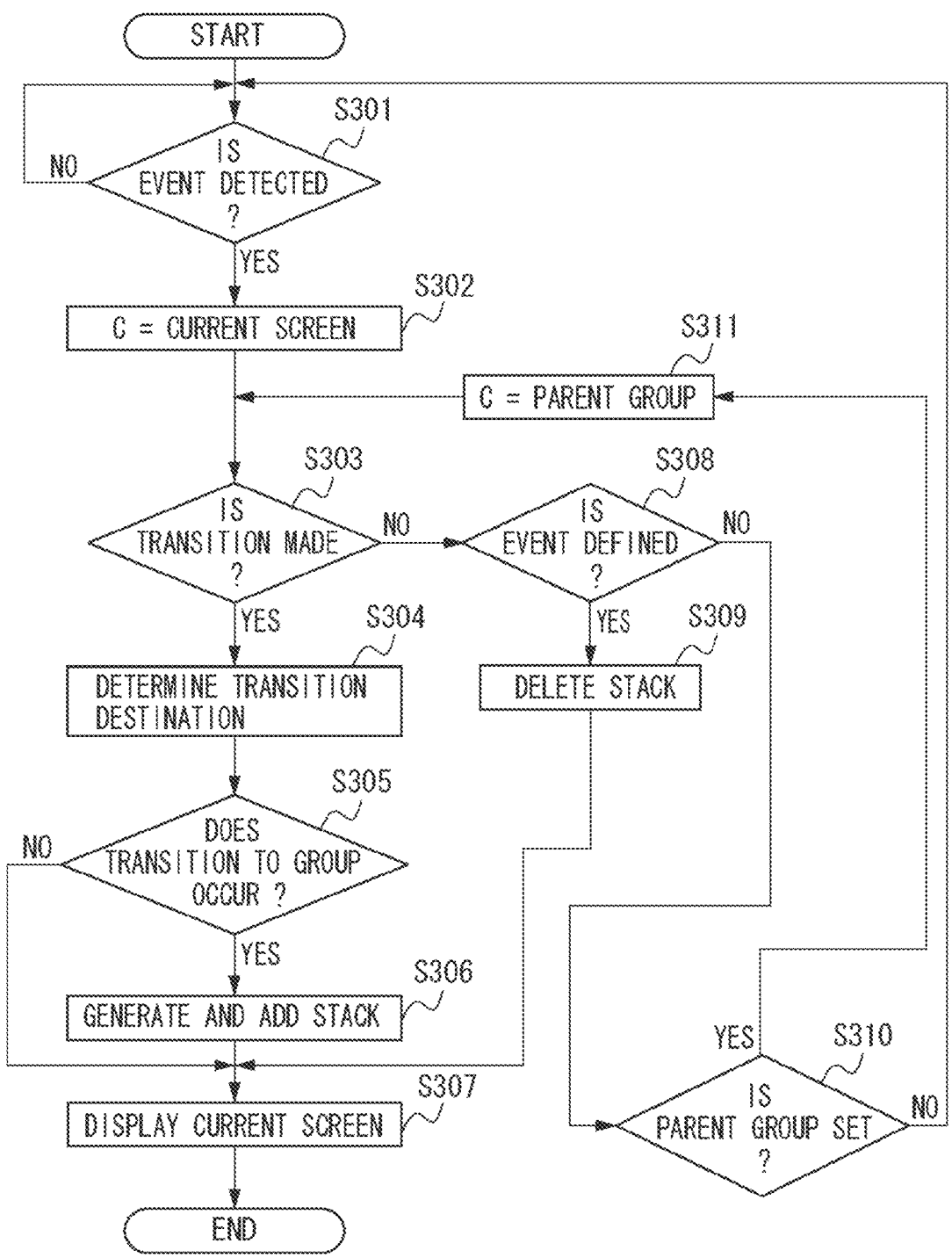

FIG. 6

```
<screentransition initialscreen="S01">
  <transition event="E11" to="S11"/>
  <transition event="E21" to="S21"/>
  <transition event="E31" to="S31"/>

<exit event="E12" remove="G1"/>
  <exit event="E22" remove="G2"/>
  <exit event="E32" remove="G2"/>

<screen id="S01">
    <transition event="E04" to="S04"/>
  </screen>
  <screen id="S04">... </screen>
  <group id="G3" priority="3">
    <screen id="S31"> ... </screen>
  </group>
  <group id="G2" priority="2">
    <screen id="S21">... </screen>
  </group>
  <group id="G1" priority="1">
    <screen id="S11">
      <transition event="E13" to="S12"/>
    </screen>
    <screen id="S12">... </screen>
  </group>
</screentransition>
```

PRIORITY ORDERED USER INTERFACE SCREENS FOR CONTROLLING A DEVICE

The present application is a continuation of U.S. patent application Ser. No. 12/642,374, filed Dec. 18, 2009, entitled "PRIORITY ORDERED USER INTERFACE SCREENS FOR CONTROLLING A DEVICE", the content of which is expressly incorporated by reference herein in its entirety. Further, the present application claims priority from Japanese Patent Application No. 2009-020227, filed Jan. 30, 2009, which is hereby incorporated by reference herein in its entirety.

BACKGROUND OF THE INVENTION

1. Field of the Invention

The present invention relates to a technique for making transition of a screen to be displayed from among a plurality of screens according to a user's operation or the like.

2. Description of the Related Art

A digital apparatus is becoming increasingly multifunctional, so that a number of screens to be switched and displayed on a display device or the like as a graphical user interface (GUI) has increased. In recent years, a digital apparatus that switches several hundred to approximately thousand screens to display the screens on a display device has existed.

When a rule for switching a plurality of screens and displaying the screens on a display device or the like (hereinafter referred to as a screen transition rule) is set, a destination screen in a transition may not be uniquely determined for a particular input event such as an input operation by a user. More specifically, a complicated screen transition rule needs to be set.

A printer is taken as an example of the above described digital apparatus to specifically describe the complicated screen transition rule.

Generally, when a cover of the printer is opened, a screen notifying a user that the cover of the printer is opened is displayed on a display device or the like connected to the printer.

When a memory card having pictures recorded thereon is inserted into a memory card slot connected to the printer, a screen for displaying a list of the pictures recorded on the memory is displayed on the display device.

Even if the memory card is inserted in a similar manner to the above when the cover of the printer is opened as an exception, however, a screen notifying the user that the cover of the printer is opened is displayed on the display device. More specifically, the screen displayed on the display device is not switched to the screen for displaying the list of pictures recorded on the memory card.

When the cover of the printer is then closed, the screen is switched to the screen for displaying the list of pictures recorded on the memory card. This is because the user should be generally notified of information relating to opening and closing of the cover of the printer in preference to information relating to an image recorded on the memory card.

Thus, the complicated screen transition rule needs to be set in connection with the opening and closing of the cover of the printer, for example, for a particular input event such as insertion of the memory card.

Conventionally, the screen transition rule for a user interface (UI) has been installed in a programming language such as a C language.

When a hypertext markup language (HTML) is used, a rule for a screen transition (a page transition on the Web) can be described using an anchor tag (<a>). More specifically, the screen transition rule can be described in a markup language.

Conventionally, a technique for setting a correspondence between information representing each screen at a transition source, and an input event for making a screen transition and a screen (a screen at a transition destination) which is displayed when the input event occurs, has been discussed (e.g., Japanese Patent Application Laid-Open No. 2000-132295).

When a screen transition rule is set such that the screen is not switched even if the memory card is inserted with the cover of the printer opened, as described above, and the screen is switched to the screen for displaying the list of pictures recorded on the memory when the cover of the printer is closed, the following problems may arise.

If the screen transition rule is set for each of the screens at the transition source, conditions of the printer and input events for making the transition of screens, setting work becomes complicated when a number of screens to be switched and displayed on the display device is increased.

When the screen transition rule is installed in the conventional programming language, a large number of man-hours is required.

SUMMARY OF THE INVENTION

The present invention is directed to a technique for efficiently designating a screen to be displayed on a display device or the like from among a plurality of candidates for screens. The present invention is further directed to a technique for efficiently setting a screen transition rule.

According to an aspect of the present invention, an information processing apparatus includes a storage unit configured to store information representing a plurality of screens in each of a plurality of groups to which priorities are previously set, a determination unit configured to determine a group which is assigned the highest priority, and a control unit configured to display on a display unit a representative screen of the group assigned the highest priority.

According to the present invention, a screen to be displayed on a display device or the like can be efficiently designated from among a plurality of candidates for screens. A screen transition rule can be efficiently set.

Even when a number of screens to be switched and displayed on a display device is increased, occurrence of complicated work for setting a screen transition rule can be avoided.

Further features of the present invention will become apparent from the following description of exemplary embodiments with reference to the attached drawings.

BRIEF DESCRIPTION OF THE DRAWINGS

The accompanying drawings, which are incorporated in and constitute parts of the specifications, illustrate exemplary embodiments, features, and aspects of the invention and, together with the description, serve to explain the principles of the invention.

FIG. 2 is a flowchart illustrating processing performed in a control unit according to the first exemplary embodiment of the present invention.

FIG. 6 illustrates an example in which data representing screen transition specifications according to a third exemplary embodiment of the present invention is described in an XML format.

DESCRIPTION OF THE EMBODIMENTS

Various exemplary embodiments, features, and aspects of the invention will be described in detail below with reference to the drawings.

Figure 1A:
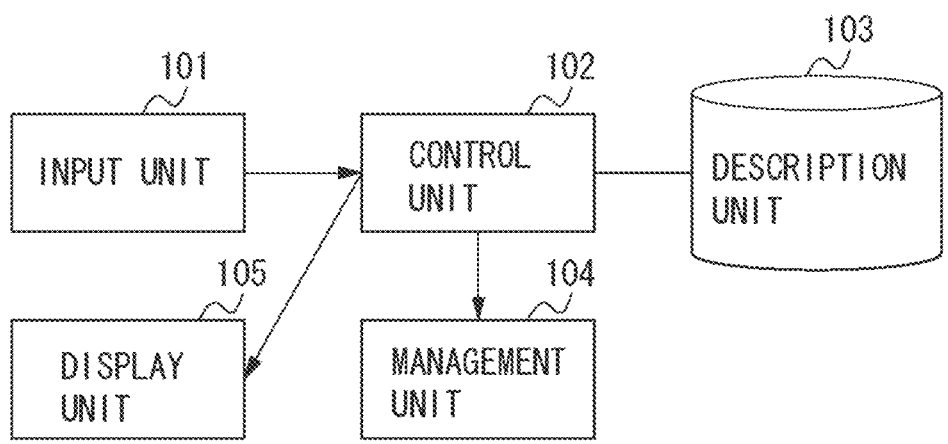
FIGS. 1A and 1B are respectively a block diagram of a printer according to a first exemplary embodiment of the present invention and a hardware configuration thereof.

FIG. 1A is a functional block diagram of a printer which serves as an example of an information processing apparatus according to the present exemplary embodiment. In FIG. 1A, the printer includes an input unit 101, a control unit 102, a description unit 103, a management unit 104, and a display unit 105.

The input unit 101 includes a plurality of buttons 204, a sensor for detecting opening and closing of a cover, and so on, and receives instruction signals such as various inputs from a user and a sensor input.

The control unit 102 includes a central processing unit (CPU) 201, and reads a program and data stored in a read-only memory (ROM) 203 to a random access memory (RAM) 202 and performs various types of processing.

The description unit 103 includes a storage medium such as the ROM 203 or the like. In the description unit 103, data representing screen transition specifications which are required in executing the program is described in a format of a program code readable by a computer (including a CPU or the like).

The management unit 104 includes the RAM 202, and manages a screen transition history or the like. The display unit 105 includes a liquid crystal display (LCD) 205, and displays various types of information which includes images, characters, and so on.

Figure 1B:
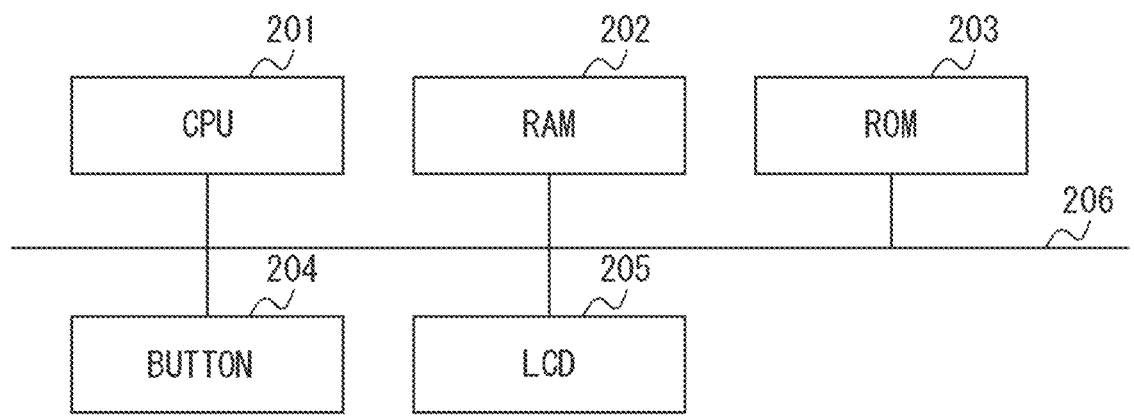

FIG. 1B illustrates a hardware configuration of the printer which serves as an example of the information processing apparatus according to the present exemplary embodiment. Elements described in the functional block diagram of FIG. 1A are assigned the same reference numerals and hence, the description thereof is not repeated.

In FIG. 1B, the hardware configuration includes the CPU 201, the RAM 202, the ROM 203, the button 204, the LCD 205, and a system bus 206. The system bus 206 connects each element in the printer, and transmits and receives signals among the elements.

Figure 3:
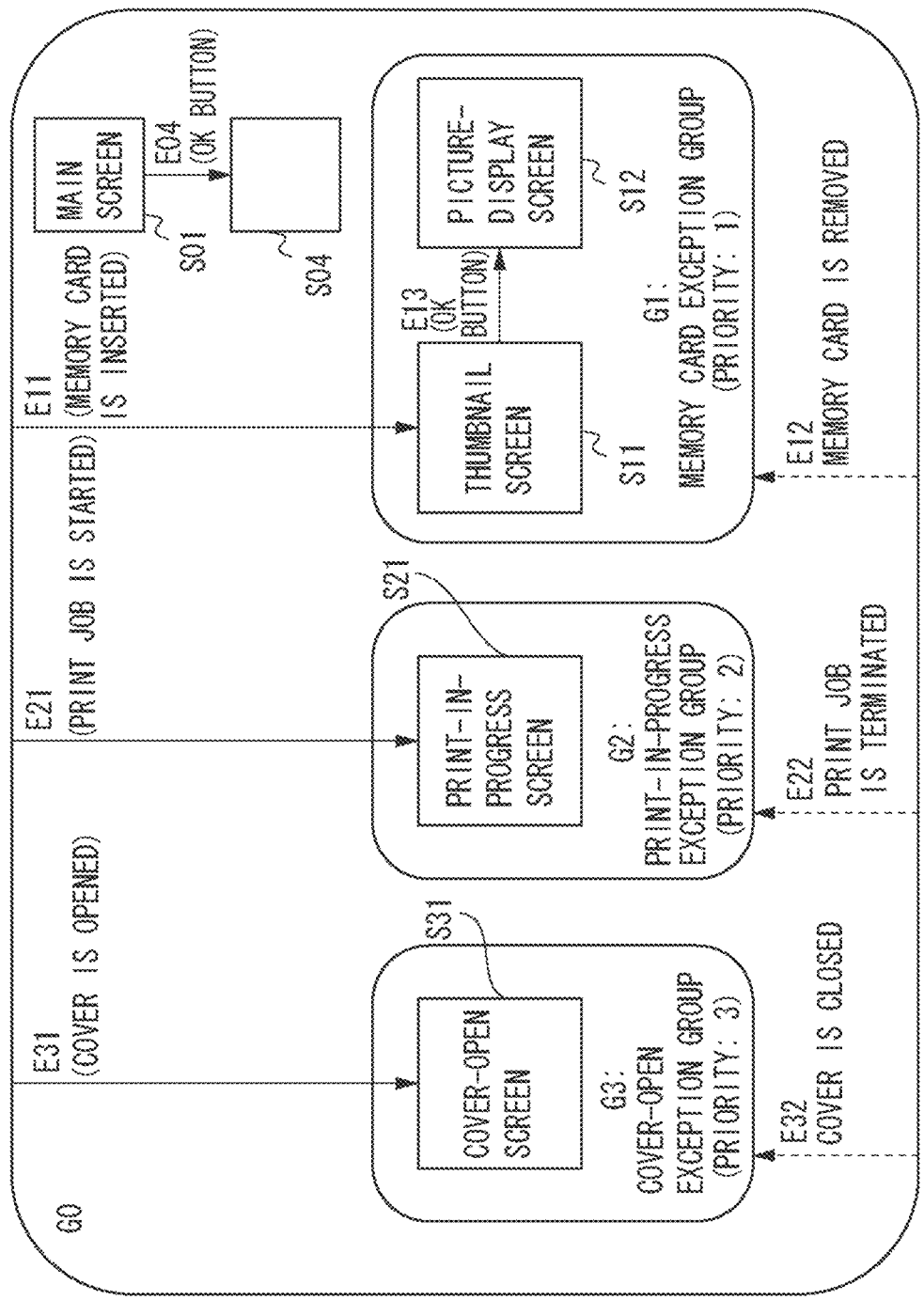
FIG. 3 is an example of a transition diagram illustrating data representing screen transition specifications according to the first exemplary embodiment of the present invention.

An example of a screen transition made in the printer will be described with reference to FIG. 3. FIG. 3 is a screen transition diagram illustrating screen transition specifications. In the printer, predetermined screen transitions are executed according to input events, described below.

When a cover of the printer is opened with any one of screens S01, S04, S11, S12, and S21 displayed on the display unit 105, a screen S31 is displayed on the display unit 105.

When printing (a print job) is started with any one of the screens S01, S04, S11, and S12 displayed on the display unit 105, the screen S21 is displayed on the display unit 105.

When a memory card is inserted into a memory card slot connected to the printer with either one of the screens S01 and S04 displayed on the display unit 105, the screen S11 is displayed on the display unit 105.

When an OK button is pressed with the screen S01 displayed on the display unit 105, the screen S04 is displayed on the display unit 105. When the OK button is pressed with the screen S11 displayed on the display unit 105, the screen S12 is displayed on the display unit 105.

When the cover of the printer is closed with the screen S31 displayed on the display unit 105, any one of the screens S01, S04, S11, S12, and S21 is displayed on the display unit 105 based on the information stored in the management unit 104.

When the printing (print job) is terminated with the screen S21 displayed on the display unit 105, any one of the screens S01, S04, S11, and S12 is displayed on the display unit 105 based on the information stored in the management unit 104.

When the memory card is removed from the memory card slot connected to the printer with either one of the screens S11 and S12 displayed on the display unit 105, either one of the screens S01 and S04 is displayed on the display unit 105 based on the information managed by the management unit 104. The information managed by the management unit 104 will be described below.

The data representing screen transition specifications used in the screen transition will be described. The data representing screen transition specifications may be binary data, or a text in an extensible markup language (XML) format, as illustrated in FIG. 6.

The control unit 102 reads out the data representing screen transition specifications to the RAM 202, to execute the screen transition.

In FIG. 3, squares (S01, S04, S11, S12, S21, and S31) respectively indicate screens, and rounded squares (G0, G1, G2, and G3) indicate groups for classifying the screens.

Solid arrows (E04, E11, E13, E21, and E31) respectively indicate screen transitions. Character strings appended to the solid arrows respectively indicate instruction signals corresponding to input events which serve as triggers for the screen transitions.

Dashed arrows (E12, E22, and E32) respectively indicate processes for deleting information belonging to predetermined groups from information relating to screen transition history managed by the management unit 104. Character strings appended to the dashed arrows respectively indicate instruction signals corresponding to input events which serve as triggers for the processes.

Processing performed in the control unit 102 when any one of the instruction signals is detected will be described with reference to a flowchart of FIG. 2.

In step S301, the control unit 102 determines whether an instruction signal is detected. If the instruction signal is detected (YES in step S301), the processing proceeds to step S302. On the other hand, if the instruction signal is not detected (NO in step S301), the control unit 102 waits until the instruction signal is detected.

In step S302, the control unit 102 sets a screen displayed on the display unit 105 as a screen transition criterion (a screen at a transition source).

In step S303, the control unit 102 examines whether a screen transition according to the instruction signal detected in step S301 is defined in the data representing screen transition specifications for the screen at the transition source. If the data representing screen transition specifications includes definition of the screen transition (YES in step S303), the processing proceeds to step S304.

On the other hand, if the data representing screen transition specifications does not includes definition of the screen transition (NO in step S303), the processing proceeds to step S308.

In step S304, the control unit 102 determines a screen at a transition destination based on the data representing screen transition specifications.

In step S305, the control unit 102 determines whether a transition from the screen at the transition source to the screen at the transition destination is from an outside of a group to which the screen at the transition destination belongs to the inside thereof. If the transition is from the outside of the group to the inside thereof (YES in step S305), the processing proceeds to step S306.

On the other hand, if the transition from the screen at the transition source to the screen at the transition destination is not from the outside of the group to which the screen at the transition destination belongs to the inside thereof (NO in step S305), the processing proceeds to step S307.

In step S306, the control unit 102 generates a new history management stack corresponding to the group to which the screen at the transition destination belongs in the management unit 104, and adds the new history management stack to a list of existing history management stacks. The stack means a memory region.

A position where the newly generated history management stack is added to the list is determined based on a priority previously assigned to the group to which the screen at the transition destination belongs.

In step S307, the control unit 102 then adds information indicating the screen at the transition destination to the history management stack corresponding to the group to which the screen at the transition destination belongs, further refers to the list, and determines the screen to be displayed on the display unit 105.

More specifically, the CPU 102 determines whether the screen to be displayed on the display unit 105 is switched to the screen at the transition destination or remains the screen at the transition source.

In step S308, the control unit 102 examines whether the instruction signal detected in step S301 is defined as an instruction signal corresponding to the input event indicated by the dashed arrow illustrated in FIG. 3. If the detected instruction signal is defined as the instruction signal corresponding to the input event (YES in step S308), the processing proceeds to step S309.

On the other hand, if the instruction signal detected in step S301 is not defined as the instruction signal corresponding to the input event indicated by the dashed arrow illustrated in FIG. 3 (NO in step S308), the processing proceeds to step S310.

In step S309, the control unit 102 deletes from the list of history management stacks the history management stack in the predetermined group to be deleted by the instruction signal which is determined to be defined as the instruction signal corresponding to the input event indicated by the dashed arrow illustrated in FIG. 3 in step S308. The control unit 102 then performs the processing in step S307, described above.

In step S310, the control unit 102 examines whether a parent group (a group to which a screen belongs) is set to the screen at the transition source. If the parent group is set (YES in step S310), the processing proceeds to step S311.

On the other hand, if the parent group is not set (NO in step S310), the processing returns to step S301 and the control unit 102 waits with the screen at the transition source displayed on the display unit 105 until a subsequent instruction signal is detected.

In step S311, the control unit 102 sets the parent group which is determined to be set in step S310 to the screen transition criterion corresponding to the screen at the transition source, and performs the processing instep S303 and the subsequent steps.

Figure 4A:
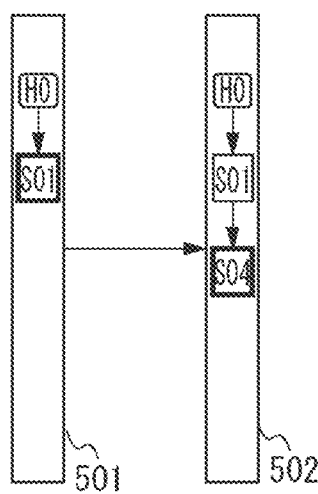
FIGS. 4A, 4B, and 4C respectively illustrate examples of a history management stack stored by a management unit.
Figure 4B:
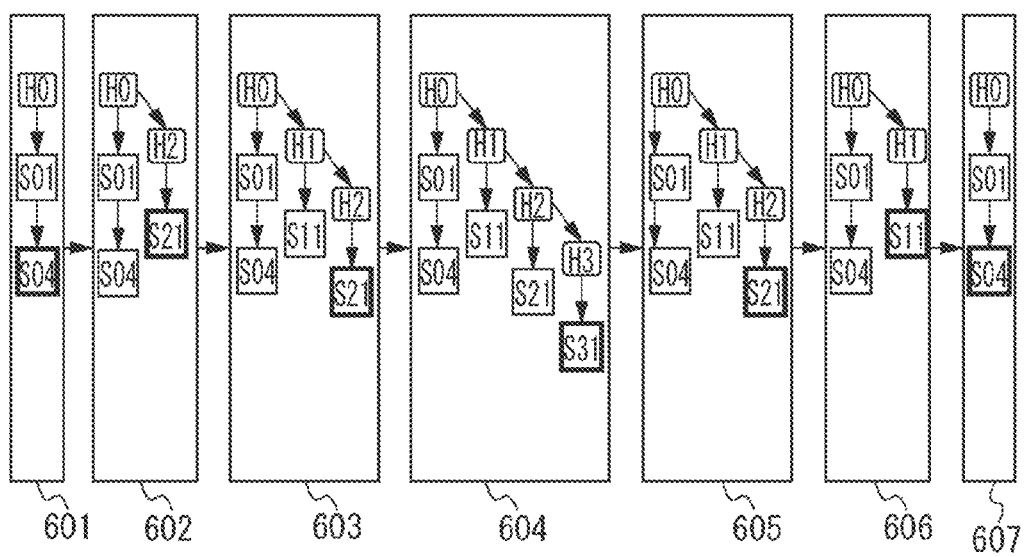

Referring to FIGS. 3, 4A, and 4B, the screen transition specifications will be described in detail. FIGS. 4A and 4B are schematic views respectively illustrating examples of the history management stacks.

It is assumed that the main screen S01 illustrated in FIG. 3 is a current screen (the screen at the transition source). A list of history management stacks in the management unit 104 at this time is schematically illustrated as a state 501 in FIG. 4A.

An active stack is a history management stack H0. A screen corresponding to information representing a screen at the head of the history management stack H0(in a lowermost portion (at the lower right) of FIG. 4A) is the screen displayed on the display unit 105.

Data representing the screen at the head of the stack is data representing a representative screen. The active history management stack means a history management stack representing a group to which the screen displayed on the display unit 105 belongs.

When an instruction signal (E04) corresponding to an input event saying that the OK button is pressed is detected via the input unit 101, the screen displayed on the display unit 105 is switched to the screen S04, as schematically illustrated in the screen transition diagram of FIG. 3.

On the other hand, in the management unit 104, data representing the screen S04 is placed on the head of the history management stack H0. The data representing the screen at the head of the stack is the data representing the representative screen.

The list of history management stacks at this time is schematically illustrated as a state 502 in FIG. 4A.

Then, it is assumed that an instruction signal corresponding to an input event for starting a print job is detected via the input unit 101.

At this time, a screen transition made by the input event for starting the print job is not defined in the information representing the screen S04 displayed on the display unit 105. However, an instruction signal E21 corresponding to the input event for starting the print job is defined in the group G0 to which the screen S04 belongs, and the screen at the transition destination is the screen S21.

A transition to the screen S21 is a screen transition from the outside of the group G2 to the inside thereof.

Therefore, the control unit 102 performs control to newly generate a history management stack H2 representing the group G2 in the management unit 104 and add the history management stack H2 to the list of history management stacks.

The list of history management stacks generated by the process is schematically illustrated as a state 602 in FIG. 4B.

An active stack at this time is the history management stack H2. Therefore, the screen S21 corresponding to information at the head of the active stack is the screen displayed on the display unit 105.

Then (before the print job is not terminated), an instruction signal corresponding to an input event saying that a memory card on which pictures are recorded is inserted into the memory card slot connected to the printer is detected via the input unit 101.

At this time, a screen transition made by the input event saying that the memory card is inserted is not defined in the screen S21 displayed on the display unit 105 and the group G2 to which the screen S21 belongs. However, as an instruction signal E11 corresponding to the input event saying that the memory card is inserted is defined in the group G0 to which the group G2 belongs.

When the instruction signal E11 corresponding to the input event saying that the memory card is inserted is detected, therefore, the screen at the transition destination is the screen S11. This transition is a screen transition from the outside of the group G1 to the inside thereof.

Therefore, the control unit 102 performs control to newly generate a history management stack H1 representing the group G1 in the management unit 104 and add the history management stack H1 to the list of history management stacks.

A priority (1) and a priority (2) are respectively assigned to the group G1 and the group G2. The priority assigned to the group G1 is lower than the priority assigned to the group G2. Therefore, the history management stack H1 is inserted between the history management stacks H2 and H0.

More specifically, in the present exemplary embodiment, the history management stacks respectively representing the groups are managed in the list of history management stacks in ascending order of values of the priority (i).

The list of history management stacks at this time is schematically illustrated as a state 603 in FIG. 4B.

Therefore, an active stack remains the history management stack H2, and the screen displayed on the display unit 105 is the screen S21 corresponding to the information at the head of the history management stack H2. More specifically, the screen transition does not occur.

Then (before the print job is not terminated), an instruction signal corresponding to an input event saying that the cover of the printer is opened is detected via the input unit 101.

At this time, a screen transition made by the input event saying that the cover of the printer is opened is not defined in the screen S21 displayed on the display unit 105 and the group G2 to which the screen S21 belongs. However, an instruction signal E31 corresponding to the input event saying that the cover of the printer is opened is defined in the group G0 to which the group G2 belongs.

When the instruction signal E31 corresponding to the input event saying that the cover of the printer is opened is detected, therefore, the screen at the transition destination is the screen S31. This transition is a screen transition from the outside of a group G3 to the inside thereof.

Therefore, the control unit 102 performs control to newly generate a history management stack H3 representing the group G3 in the management unit 104 and add the history management stack H3 to the list of history management stacks.

A priority (3) and a priority (2) are respectively assigned to the group G3 and the group G2. The priority assigned to the group G3 is higher than the priority assigned to the group G2. Therefore, the history management stack H3 is added to the outside of the history management stack H2.

The list of history management stacks at this time is schematically illustrated as a state 604 in FIG. 4B.

Therefore, an active stack is the history management stack H3, and the screen displayed on the display unit 105 is the screen S31 corresponding to the information at the head of the history management stack H3. More specifically, the screen displayed on the display unit 105 is switched from the screen S21 to the screen S31.

Then (before the print job is not terminated), an instruction signal corresponding to an input event saying that the cover of the printer is closed is detected via the input unit 101.

At this time, a screen transition made by the input event saying that the cover of the printer is closed is not defined in the screen S31 displayed on the display unit 105 and the group G3 to which the screen S31 belongs. However, an instruction signal E32 corresponding to the input event saying that the cover of the printer is closed is defined in the group G0 to which the group G3 belongs.

When the instruction signal E32 is detected, an action saying that the history management stack H3 representing the group G3 is deleted from the list of history management stacks is set.

Therefore, the control unit 102 performs control to delete the history management stack H3 representing the group G3 from the management unit 104.

The list of history management stacks at this time is schematically illustrated as a state 605 in FIG. 4B.

As a result, an active stack is the history management stack H2, and the screen displayed on the display unit 105 is switched from the screen S31 to the screen S21 corresponding to the information at the head of the history management stack H2.

Then, it is assumed that an instruction signal corresponding to an input event saying that the print job is terminated is detected via the input unit 101.

At this time, a screen transition made by the input event saying that the print job is terminated is not defined in the screen S21 displayed on the display unit 105 and the group G2 to which the screen S21 belongs. However, an instruction signal E22 corresponding to the input event saying that the print job is terminated is defined in the group G0 to which the group G2 belongs.

When the instruction signal E22 is detected, an action saying that the history management stack H2 representing the group G2 is deleted from the list of history management stacks is set.

Therefore, the control unit 102 performs control to delete the history management stack H2 representing the group G2 from the management unit 104.

The list of history management stacks at this time is schematically illustrated as a state 606 in FIG. 4B.

As a result, an active stack is the history management stack H1, and the screen displayed on the display unit 105 is switched from the screen S21 to the screen S11 corresponding to the information at the head of the history management stack H1.

When an instruction signal E13 corresponding to an input event saying that the OK button is pressed is then detected via the input unit 101, the screen displayed on the display unit 105 is switched to the screen S12, as schematically illustrated in the screen transition diagram of FIG. 3.

On the other hand, in the management unit 104, data representing the screen S12 is placed on the head of the active history management stack H1. This is because the screen S12 belongs to the group G1 to which the screen S11 belongs.

The list of history management stacks at this time is schematically illustrated as a state 607 in FIG. 4B. As a result, the screen S12 is displayed on the display unit 105.

An instruction signal corresponding to an input event saying that the memory card on which pictures are recorded is removed from the memory card slot connected to the printer is then detected via the input unit 101.

At this time, a screen transition made by the input event saying that the memory card is removed is not defined in the screen S12 displayed on the display unit 105 and the group G1 to which the screen S12 belongs. However, an instruction signal E12 corresponding to the input event saying that the memory card is removed is defined in the group G0 to which the group G1 belongs.

When the instruction signal E12 is detected, an action saying that the history management stack H1 representing the group G1 is deleted from the list of history management stacks is set.

Therefore, the control unit 102 performs control to delete the history management stack H1 representing the group G1 from the management unit 104. The list of history management stacks at this time is schematically illustrated as a state 607 in FIG. 4B.

As a result, an active stack is the history management stack H0, and the screen displayed on the display unit 105 is switched from the screen S12 to the screen S04 corresponding to the information at the head of the history management stack H0.

If the memory card is removed, as described above, when the list of history management stacks is illustrated as the state 606 in FIG. 4B, i.e., when the screen S11 is displayed on the display unit 105, the history management stack H1 is similarly deleted.

Therefore, the screen displayed on the display unit 105 is switched from the screen S11 to the screen S04.

As described above, the information processing apparatus according to the present exemplary embodiment can simply describe, as illustrated in FIG. 3, a complicated screen transition rule.

Although in the present exemplary embodiment, the printer has been described as an example, the present invention is also applicable to a digital apparatus which includes a display device and can switch a plurality of screens and display the screens on the display device.

Although in the above described first exemplary embodiment, the management unit 104 divides the history management stack for each group, the number of history management stacks may be one.

Figure 4C:
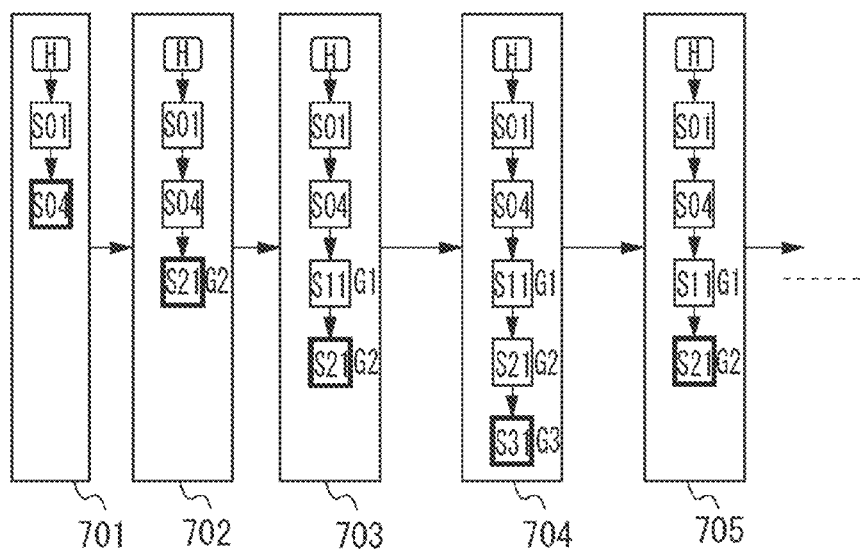

In a second exemplary embodiment, i.e., as illustrated in FIG. 4C, one history management stack may manage groups to which screens belong on the stack, and a screen may be added, inserted, or deleted to or from the history management stack in a group unit.

When the history management stack is changed from a state 702 to a state 703, for example, a priority assigned to a group G1 to which a screen S11 belongs is lower than a priority assigned to a group G2. Therefore, the screen S11 is inserted into the history management stack more internally than a screen S21.

A screen S31 belonging to a group G3 is deleted from the history management stack so that the history management stack is changed from a state 704 to a state 705.

Although in the above described exemplary embodiments, screen transition specification description data is illustrated by the transition diagram of FIG. 3, it is actually a text or binary data. In the case of the text, an XML may be used.

In a third exemplary embodiment, the transition diagram of FIG. 3 can be described in an XML as illustrated in FIG. 6, for example. The meaning of each element is as follows:

<screentransition>: is a root element, and corresponds to a group G0 illustrated in FIG. 3.
<screen>: represents a screen, and is indicated by a square in FIG. 3.
<group>: represents a group, and corresponds to G1, G2, and G3 indicated by rounded squares in FIG. 3.
A priority attribute for the element <group> corresponds to the priority illustrated in FIG. 3.
<transition>: represents a screen transition, and is indicated by a solid arrow in FIG. 3.
<exit>: represents an action saying that a group is deleted, and is indicated by a dashed arrow in FIG. 3.

Figure 5:
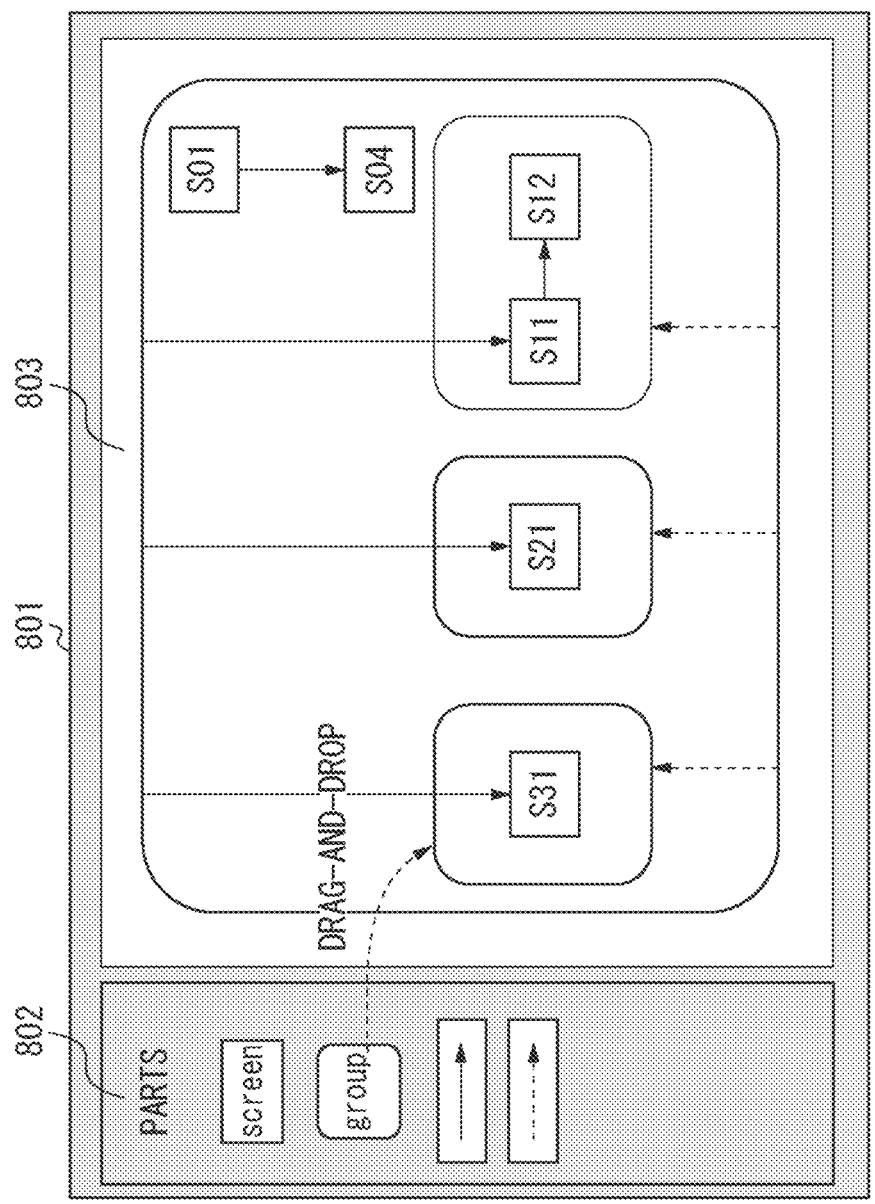
FIG. 5 illustrates an example of a design tool for designing data representing screen transition specifications according to a fourth exemplary embodiment of the present invention.

Although in the above described third exemplary embodiment, the screen transition specification description data may be a text in an XML format or the like or binary data, the data may be designed with a design tool 801 as illustrated in FIG. 5 in a fourth exemplary embodiment.

The design tool 801 is a tool for drawing the transition diagram of FIG. 3, and can edit the transition diagram by dragging and dropping necessary parts in a transition diagram field 803 from a part group 802 in the transition diagram.

The part group 802 includes at least a "screen", a "group", a transition arrow (solid arrow), and an action (dashed arrow) for deleting the group.

The part "screen" is arranged in the part "group" by a dragging operation so that a state where the screen belongs to the group can be represented.

A transition diagram is drawn with such a tool, and a "save button" which is one of the buttons 204 is pressed so that the contents of the transition diagram is output to a file in an XML format as illustrated in FIG. 6.

The file itself or binary data obtained by converting the file to have contents equivalent thereto is stored in a screen transition specification description unit 103.

Further, the control unit 102 reads and executes the file or the binary data, so that an operation described in the screen transition specification designed with the tool can be realized on a digital apparatus such as a printer.

Although in the above described first and second exemplary embodiments, it is assumed that the data representing screen transition specifications is generated during UI design and is incorporated in advance into a real machine of the printer.

In a fifth exemplary embodiment, however, a printer may load another screen transition specification description data and replace existing data representing screen transition specifications therewith by using a memory card, a network, or the like as a medium, to enable customization of a screen transition rule.

Figure 7:
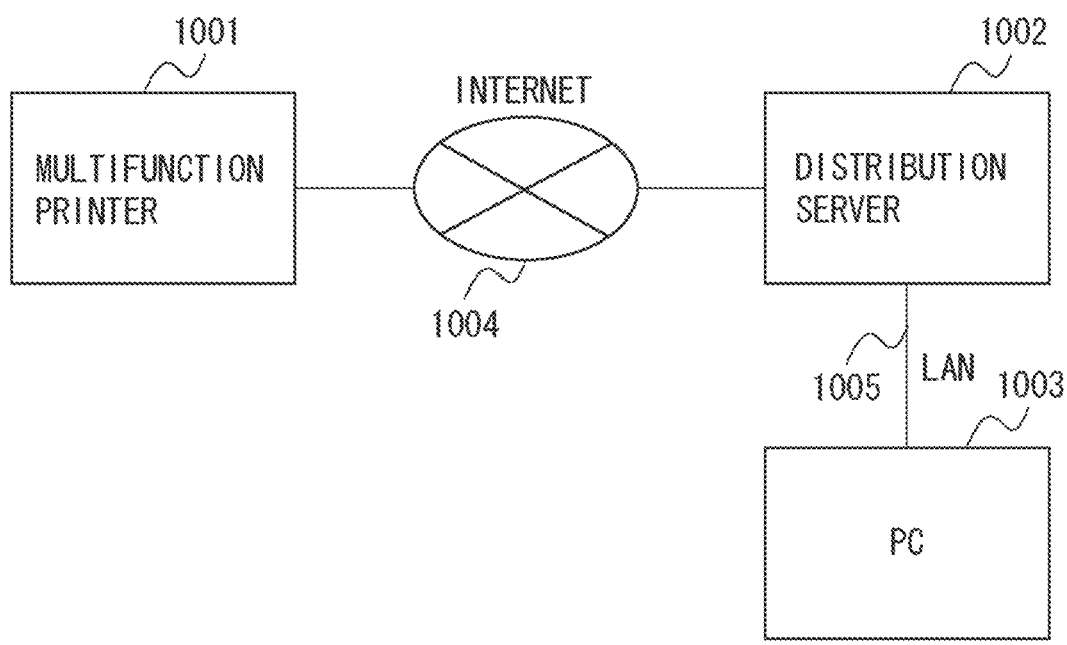
FIG. 7 illustrates a configuration according to a fifth exemplary embodiment of the present invention.

FIG. 7 illustrates how a multifunction printer 1001 is connected to a distribution server 1002 via the Internet 1004, and the distribution server 1002 is connected to a personal computer (PC) 1003 via a local area network (LAN) 1005.

The PC 1003 generates data representing screen transition specifications in an XML format or a binary format using a design tool as described in the fourth exemplary embodiment.

The generated data representing screen transition specifications is uploaded to the distribution server 1002 via the LAN 1005. The uploaded data representing screen transition specifications is transmitted to the multifunction printer 1001 via the Internet 1004.

Figure 8:
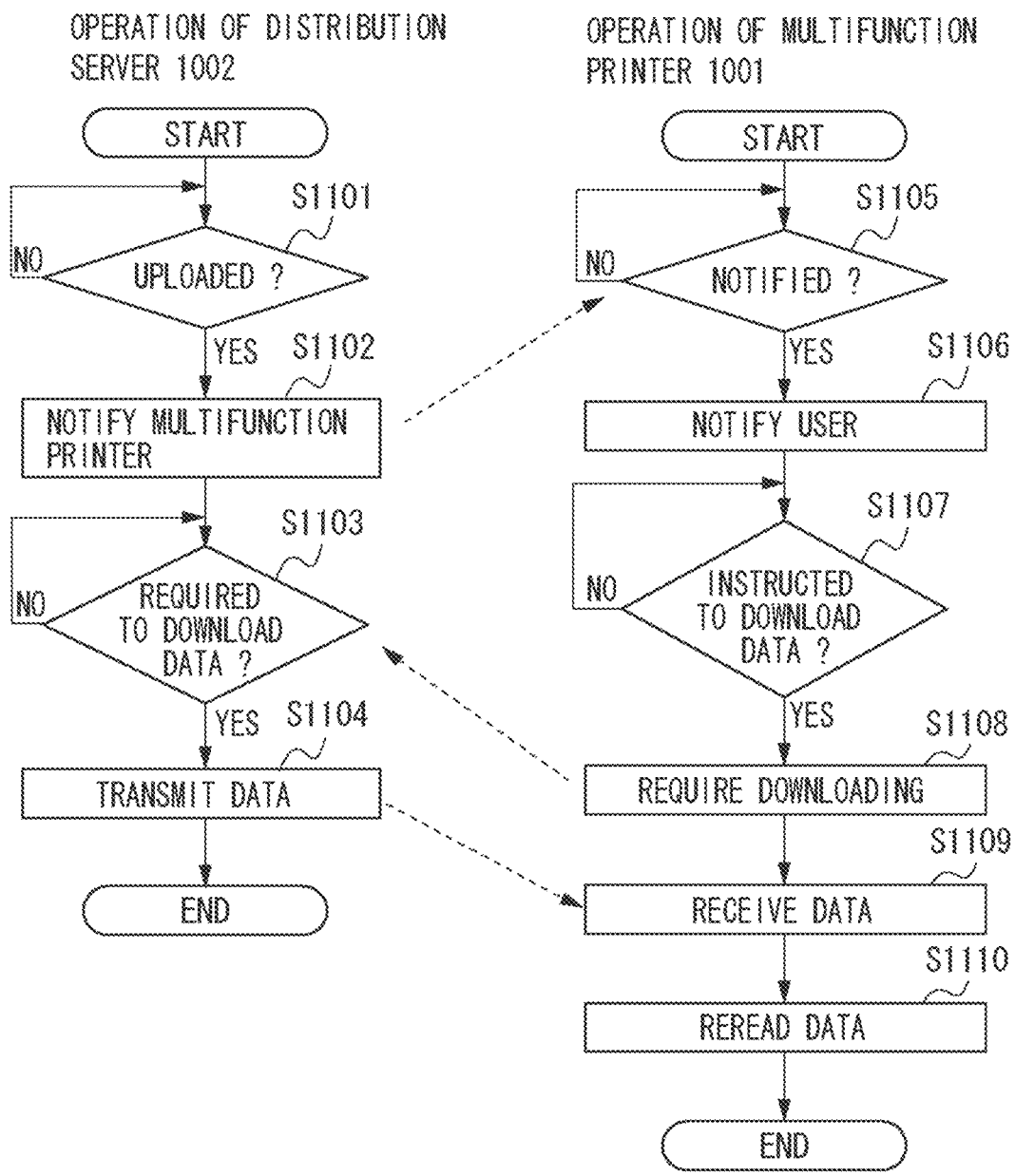
FIG. 8 is a flowchart illustrating respective operations of a printer and a distribution server according to the fifth exemplary embodiment of the present invention.

The operations of the multifunction printer 1001 and the distribution server 1002 will be described with reference to a flowchart of FIG. 8.

In step S1101, the distribution server 1002 checks whether data representing screen transition specifications is uploaded from the PC 1003.

If the data representing screen transition specifications is uploaded (YES in step S1101), then in step S1102, the distribution server 1002 notifies the multifunction printer 1001 that new data representing screen transition specifications is downloadable via the Internet 1004.

In step S1105, the multifunction printer 1001 checks whether it is notified that the new data representing screen transition specifications is downloadable by the distribution server 1002. If the printer is notified (YES in step S1105), then in step S1106, the multifunction printer 1001 notifies a user that the new data representing screen transition specifications is downloadable by display on an LCD 205.

In step S1107, the multifunction printer 1001 checks whether it is instructed to download the new data representing screen transition specifications by the user. If the multifunction printer 1001 is instructed (YES in step S1107), then instep S1108, the multifunction printer 1001 requires the distribution server 1002 to download the new data representing screen transition specifications via the Internet 1103.

In step S1103, the distribution server 1002 checks whether it is required to download the new data representing screen transition specifications by the multifunction printer 1101. If the distribution server 1002 is required (YES in step S1103), then in step S1104, the distribution server 1002 transmits the new data representing screen transition specifications to the multifunction printer 1001 via the Internet 1003.

In step S1109, the multifunction printer 1001 receives the new data representing screen transition specifications that have been transmitted.

In step S1110, the control unit 102 reads the new data representing screen transition specifications to execute the screen transition based on the new data representing screen transition specifications.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus which refers to a stack, and determines a screen to be displayed on a display unit, the apparatus comprising:
   an obtaining unit configured to obtain an input signal of an event which serves as a trigger of screen transition of a screen displayed on the display unit;
   a storage unit configured to store, in each of a plurality of groups to which priorities are previously set, the stack which is for identifying a screen which is a candidate of a transition destination of the screen transition, according to the input signal obtained by the obtaining unit; and
   a control unit configured to determine a representative screen of each of the plurality of groups, based on a position in the stack where information indicating the screen is stored, and display on the display unit a representative screen of a group which is assigned the highest priority among the plurality of groups.

2. The information processing apparatus according to claim 1,
   wherein the storage unit adds information indicating a screen which is a new candidate of the transition destination of the screen transition into the stack according to the input signal obtained by the obtaining unit, wherein the information is added to the top of a stack corresponding to a group to which a screen indicated by the information belongs, and
   wherein the control unit determines, as a representative screen for each of the plurality of groups, a screen indicated by information stored at the top of a stack of each of the plurality of groups.

3. The information processing apparatus according to claim 1, wherein when the storage unit adds information indicating a screen which is a new candidate of the transition destination of the screen transition into the stack according to the input signal obtained by the obtaining unit, if a priority of a group to which a screen indicated by the information belongs becomes the highest, the control unit performs transition of the screen displayed on the display unit to the screen indicated by the information.

4. The information processing apparatus according to claim 1,
   wherein the information processing apparatus is a printer, and
   wherein the event is input in response to operation of the printing.

5. The information processing apparatus according to claim 1,
   wherein the information processing apparatus is a printer, and
   wherein the input events include at least one of an event which occurs when a cover of the printer is opened, an event which occurs when printing is started, an event which occurs when a memory card is inserted into a memory card slot connected to the printer, an event which occurs when an OK button is pressed, an event which occurs when the cover of the printer is closed, an event which occurs when the printing is terminated and an event which occurs when the memory card is removed from the memory card slot connected to the printer.

6. A method for processing information which is executed by an information processing apparatus which refers to a stack, and determines a screen to be displayed on a display unit, the method comprising:
   an obtaining step of obtaining an input signal of an event which serves as a trigger of screen transition of a screen displayed on the display unit;
   a storing step of storing, in each of a plurality of groups to which priorities are previously set, the stack which is for identifying a screen which is a candidate of a transition destination of the screen transition, according to the obtained input signal; and
   a controlling step of determining a representative screen of each of the plurality of groups, based on a position in the stack where information indicating the screen is stored, and displaying on the display unit a representative screen of a group which is assigned the highest priority among the plurality of groups.

7. The method according to claim 6,
   wherein, in the storing step, information indicating a screen which is a new candidate of the transition destination of the screen transition is added into the stack according to the obtained input signal, wherein the information is added to the top of a stack corresponding to a group to which a screen indicated by the information belongs, and
   wherein, in the controlling step, a screen indicated by information stored at the top of a stack of each of the plurality of groups is determined as a representative screen of each of the plurality of groups.

8. The method according to claim 6, wherein when, in the storing step, information indicating a screen which is a new candidate of the transition destination of the screen transition is added into the stack according to the obtained input signal, if a priority of a group to which a screen indicated by the information belongs becomes the highest, the controlling step performs transition of the screen displayed on the display unit to the screen indicated by the information.

9. The method according to claim 6,
wherein the information processing apparatus is a printer, and
wherein the event is input in response to operation of the printing.

10. The method according to claim 6,
wherein the information processing apparatus is a printer, and
wherein the input events include at least one of an event which occurs when a cover of the printer is opened, an event which occurs when printing is started, an event which occurs when a memory card is inserted into a memory card slot connected to the printer, an event which occurs when an OK button is pressed, an event which occurs when the cover of the printer is closed, an event which occurs when the printing is terminated and an event which occurs when the memory card is removed from the memory card slot connected to the printer.

11. A non-transitory computer readable storage medium which stores a program for executing a method for processing information which is executed by an information processing apparatus which refers to a stack, and determines a screen to be displayed on a display unit, the method comprising:
an obtaining step of obtaining an input signal of an event which serves as a trigger of screen transition of a screen displayed on the display unit;
a storing step of storing, in each of a plurality of groups to which priorities are previously set, the stack which is for identifying a screen which is a candidate of a transition destination of the screen transition, according to the obtained input signal; and
a controlling step of determining a representative screen of each of the plurality of groups, based on a position in the stack where information indicating the screen is stored, and displaying on the display unit a representative screen of a group which is assigned the highest priority among the plurality of groups.

12. An apparatus comprising:
an obtaining unit configured to obtain an input signal which represents a trigger of transition of a screen image displayed on a display unit;
a storage unit configured to save information which represents a screen image corresponding to the input signal obtained by the obtaining unit, the screen image being classified into any one of a plurality of groups to which priorities are previously set, in a stack for each group of the plurality of groups; and, a control unit configured to determine an screen image to be displayed on the display unit based on a position where information representing the screen image is saved in the stack corresponding to a group to which the highest priority is set among stacks for the plurality of groups stored in the storage unit where the information representing the screen image is stored.

13. A method for processing information which is executed by an apparatus, the method comprising:
an obtaining step of obtaining an input signal which represents a trigger of transition of a screen image displayed on a display unit;
a storing step of saving information which represents a screen image corresponding to the obtained input signal, the screen image being classified into any one of a plurality of groups to which priorities are previously set, in a stack for each group of the plurality of groups; and, a controlling step of determining an screen image to be displayed on the display unit based on a position where information representing the screen image is saved in the stack corresponding to a group to which the highest priority is set among stacks for the plurality of groups where the information representing the screen image is stored.

14. A non-transitory computer readable storage medium which stores a program for executing a method for processing information which is executed by an apparatus , the method comprising:
an obtaining step of obtaining an input signal which represents a trigger of transition of a screen image displayed on a display unit;
a storing step of saving information which represents a screen image corresponding to the obtained input signal, the screen image being classified into any one of a plurality of groups to which priorities are previously set, in a stack for each group of the plurality of groups; and, a controlling step of determining an screen image to be displayed on the display unit based on a position where information representing the screen image is saved in the stack corresponding to a group to which the highest priority is set among stacks for the plurality of groups where the information representing the screen image is stored.

* * * * *